United States Patent [19]

Rolf

[11] Patent Number: 5,628,928

[45] Date of Patent: May 13, 1997

[54] METHOD FOR REDUCING THE POTENTIAL DIFFERENCE IN AN ELECTRICALLY HEATABLE CONVERTER BY CONNECTING THE STRIP HEATER TO CORRUGATED STRIP WITH AN ELECTRICAL CONDUCTOR

[75] Inventor: Stanley C. Rolf, Mantua, Ohio

[73] Assignee: W. R. Grace & Co.-Conn., New York, N.Y.

[21] Appl. No.: 457,066

[22] Filed: Jun. 1, 1995

Related U.S. Application Data

[62] Division of Ser. No. 224,763, Apr. 8, 1994, Pat. No. 5,431,886.

[51] Int. Cl.$^6$ .................... H05B 3/02; F01N 3/10
[52] U.S. Cl. .................. 219/488; 219/476; 219/553; 55/DIG. 30; 60/300; 422/174; 422/180
[58] Field of Search .................... 219/476, 483, 219/485, 488, 504, 543, 552–553; 338/295; 55/DIG. 30; 60/300; 422/174, 180, 199, 211; 392/485, 488

[56] References Cited

U.S. PATENT DOCUMENTS

| | | | |
|---|---|---|---|
| 3,768,982 | 10/1973 | Kitzner | 422/174 |
| 3,770,389 | 11/1973 | Kitzner | 422/174 |
| 3,795,524 | 3/1974 | Sowman | 501/95 |
| 3,916,057 | 10/1975 | Hatch | 428/236 |
| 4,381,590 | 5/1983 | Nonnenmann | 29/890 |
| 4,414,023 | 11/1983 | Aggen | 420/40 |
| 4,505,726 | 3/1985 | Takeuchi et al. | 55/282 |
| 4,671,931 | 6/1987 | Herchenroeder | 420/445 |
| 4,711,009 | 12/1987 | Cornelison et al. | 29/890 |
| 4,810,588 | 3/1989 | Bullock | 428/603 |
| 4,859,980 | 8/1989 | Hammond | 338/308 |
| 5,055,275 | 10/1991 | Kannainen | 422/180 |
| 5,070,694 | 12/1991 | Whittenberger | 60/300 |
| 5,140,812 | 8/1992 | Cornelison et al. | 60/300 |
| 5,146,743 | 9/1992 | Maus et al. | 60/274 |
| 5,202,547 | 4/1993 | Abe et al. | 219/552 |
| 5,433,926 | 7/1995 | Swars | 422/174 |
| 5,529,759 | 6/1996 | Sanada et al. | 422/174 |

FOREIGN PATENT DOCUMENTS

| | | |
|---|---|---|
| 0245736A1 | 5/1987 | European Pat. Off. . |
| 4102890A1 | 8/1992 | Germany . |
| WO89/10471 | 11/1989 | WIPO . |
| WO89/10470 | 11/1989 | WIPO . |
| WO90/12951 | 11/1990 | WIPO . |
| WO92/13636 | 8/1992 | WIPO . |

OTHER PUBLICATIONS

SAE Paper # 890799 "Resistive Materials Applied to Quick Light–Off Catalysts" Hellman et al, Feb. 27–Mar. 3, 1989.

*Primary Examiner*—Teresa J. Walberg
*Assistant Examiner*—Raphael Valencia
*Attorney, Agent, or Firm*—Beverly J. Artale

[57] ABSTRACT

A converter having electrically heatable strips connected in an electrical circuit, and intertwined with non-electricvally heated thin metal strips, having an electrical connection, or anchor, from the electrically heatable thin metal strips to the non-electrically heated thin metal strips, whereby the potential difference between the electrically heatable strips non-electrically heatable thin metal strips is reduced.

1 Claim, 2 Drawing Sheets

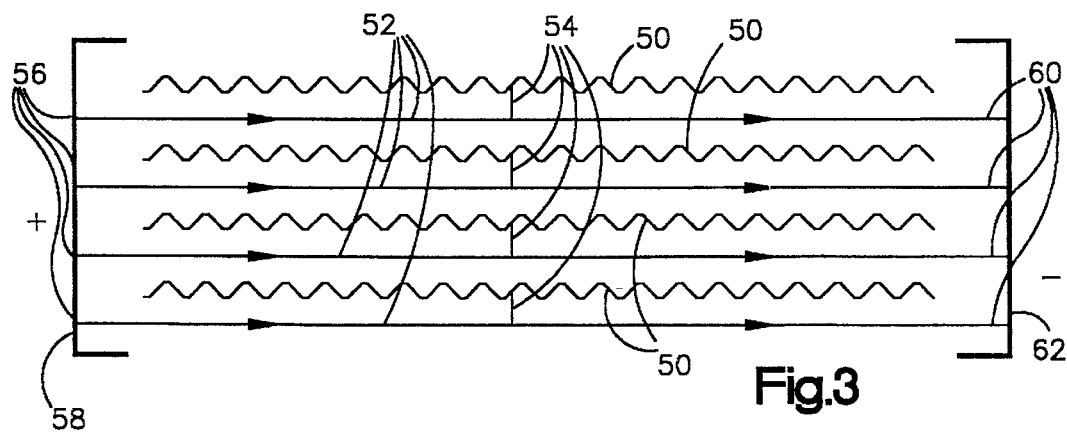
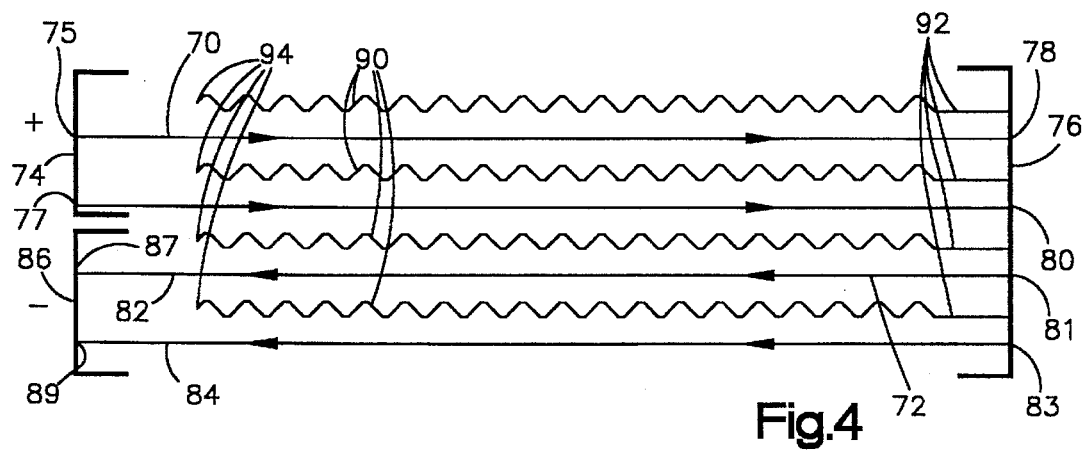
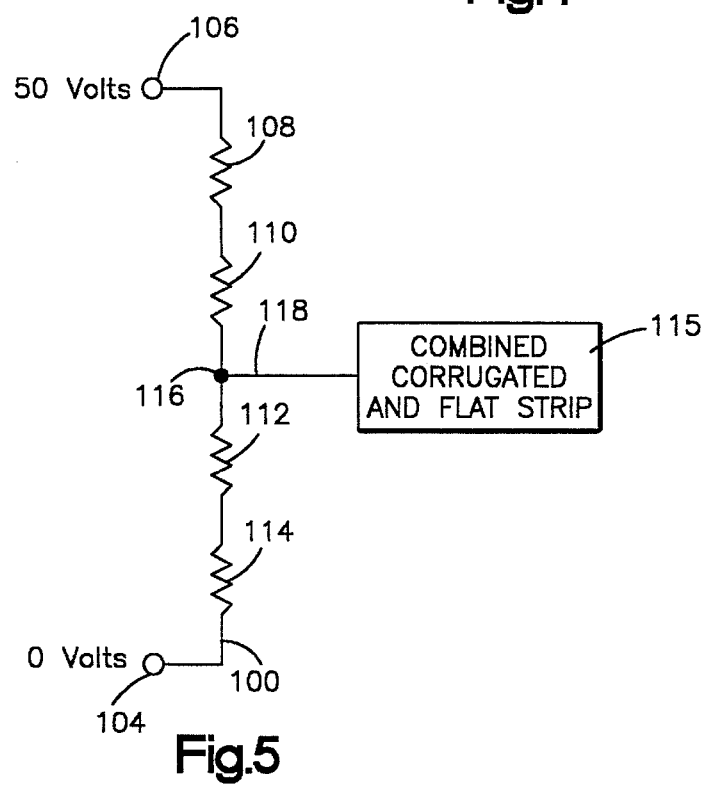

METHOD FOR REDUCING THE POTENTIAL DIFFERENCE IN AN ELECTRICALLY HEATABLE CONVERTER BY CONNECTING THE STRIP HEATER TO CORRUGATED STRIP WITH AN ELECTRICAL CONDUCTOR

This is a division of application Ser. No. 08/224,763, filed Apr. 8, 1994 U.S. Pat. No. 5,431,886.

This invention relates to a combined electrically heatable and a non-electrically heatable converter, and more particularly to an improved combined electrically heatable and light-off converter in which the electrically heatable portion is electrically connected to the "light-off" portion. The purpose of the connection is to reduce the potential difference between the thin metal leaves or layers making up the electrically heatable portion and the thin metal leaves or layers making up the "light-off" portion. The thin metal layers of both portions are coated, usually with a refractory metal oxide coating, e.g., alumina-containing, and the dielectric strength of the coatings is oftentimes insufficient to withstand the voltages impressed on the electrically heatable portion. The present invention improves the converter by reducing the tendency to arcing or shorting through from the electrically heated thin metal layers to the non-electrically heated thin metal layers of, for example, the "light-off" portion. More specifically, the electrically heated thin metal layers are intertwined with the non-heated thin metal layers.

BACKGROUND OF THE INVENTION AND PRIOR ART

This invention is, as indicated, an improvement on a combined electrically heatable converter including an electrically heatable portion and a "light-off" portion, each portion being made up of corrugated thin metal strips or layers in alternating relation with flat thin metal strips or layers. Electrical power is supplied to the electrically heatable portion only. Such devices are described in co-pending, commonly owned U.S. patent applications Ser. No. 08/013,516 filed 3 Feb. 1993 by Whittenberger and Woodruff, and 08/066,887 filed 25 May 1993 by Whittenberger. These applications are incorporated herein by reference thereto.

The invention will be described in connection with embodiments especially adapted for use in exhaust lines from various types of engines, e.g., internal combustion engines of the spark ignited or compression ignited types, stationary or mobile, or gas turbine engines. It will be understood, however, that the converters of the present invention may be used to effect various chemical reactions, particularly those occurring in fluid streams, especially gas streams, which reactions are catalyzed or uncatalyzed.

Turning now to converters especially useful in exhaust lines extending from internal combustion engines, e.g., those used in automotive vehicles, the purpose of such catalytic converters is to convert pollutant materials present in the exhaust stream, e.g., carbon monoxide, unburned hydrocarbons, ozone, nitrogen oxides, etc., to carbon dioxide, nitrogen oxygen and water prior to discharge to the atmosphere. Conventional automotive catalytic converters utilize an oval or circular cross-section ceramic honeycomb monolith having square or triangular straight-through openings or cells with catalyst deposited on the walls of the cells; catalyst coated refractory metal oxide beads or pellets, e.g., alumina beads; or a corrugated thin metal foil multicelled honeycomb monolith having a refractory metal oxide coating and catalyst carried on the coating and supported on the surfaces of the cells. The catalyst is normally a noble metal, e.g., platinum, palladium, rhodium, ruthenium, or a mixture of two or more of such metals. Zeolite coatings may also be used for the adsorption and desorption of pollutants to aid in their removal. The catalyst catalyzes a chemical reaction, mainly oxidation, whereby the pollutant is converted to a harmless by-product which passes through the exhaust system to the atmosphere.

However, conversion to such harmless by-products is not efficient initially when the exhaust gases are relatively cold, e.g., at cold engine start. To be effective at a high conversion rate, the catalyst and the surface of the converter must be at or above a minimum temperature, e.g., 390 degrees F. for carbon monoxide, 570 degrees F. for volatile organic compounds, and about 900 degrees F. for methane or natural gas. Otherwise, conversion to harmless by-products is poor and cold start pollution of the atmosphere is high. It has been estimated that as much as 80% of the atmospheric pollution caused by vehicles even though equipped with conventional non-electrically heated catalytic converters, occurs in the first two minutes of operation of the engine from cold start. Once the exhaust system has reached its normal operating temperature, a non-electrically heated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines such as used in lawn mowers, trimmers, boat engines, and the like have this need.

To achieve initial heating of the catalyst at engine start-up, there is conveniently provided an electrically heatable catalytic converter unit, preferably one formed of a thin metal honeycomb monolith. The monolith may be formed of spaced flat thin metal strips, straight-through corrugated thin metal strips, pattern corrugated thin metal strips, e.g., herringbone or chevron corrugated thin metal strips, or variable pitch corrugated thin metal strips (such as disclosed in U.S. Pat. No. 4,810,588 dated 7 Mar. 1989 to Bullock et al) or a combination thereof, which monolith is connected to a 12 volt to 108 volt or higher AC or DC voltage source, single or multi-phase, preferably at the time of engine start-up and afterwards to elevate the catalyst to and maintain the catalyst at a temperature of at least 650 degrees F. plus or minus 30 degrees F. Alternatively, power may also be supplied for a few seconds prior to engine start-up.

Catalytic converters containing a corrugated thin metal (stainless steel) monolith have been known since at least the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987 to Cornelison et al; U.S. Pat. Nos. 4,152,302 dated 1 May 1979, 4,273,681 dated 16 Jun. 1981, 4,282,186 dated 4 Aug. 1981, 4,381,590 dated 3 May 1983, 4,400,860 dated 30 Aug. 1983, 4,519,120, dated 28 May 1985, 4,521,947 dated 11 Jun. 1985, 4,647,435 dated 3 Mar. 1987, 4,665,051, dated 12 May 1987 all to Nonnenmann alone or with another; U.S. Pat. No. 5,070,694 dated 10 Dec. 1991 to Whittenberger; International PCT Publication Numbers WO 89/10470 (EP 412,086) and WO 89/10471 (EP 412,103) each filed 2 Nov. 1989 claiming priority date of 25 Apr. 1988. The above International Publication Numbers disclose methods and apparatus for increasing the internal resistance of the device by placing spaced discs in series, or electrically insulating intermediate layers. Another International PCT Publication is WO 90/12951 published 9 Apr. 1990 and claiming a priority date of 21 Apr. 1989, seeks to improve axial strength by form locking layers of insulated plates. Another reference which seeks to improve axial strength is U.S. Pat. No. 5,055,275 dated 8 Oct. 1991 to Kannainian et al. Reference may also be had to PCT Publication Number WO 92/13636 filed 29 Jan. 1992 claiming a priority date of 31 Jan. 1991. This application relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through through exhaust gas passing through or applied electrical current. The honeycomb body serves as a bearer for catalyst in the exhaust system of an internal combustion engine. Another reference is German Patent Application Number 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing portions. Groups of such strips are separated by insulation means. The core is provided with a pair of circular retainer segments which are separated by insulation means. Another reference is U.S. Pat. No. 5,102,743 dated 7 Apr. 1992 to Maus. This patent discloses a honeycomb catalyst carrier body of round, oval or elliptical cross-section including a jacket tube and a stack of at least partially structured sheet metal alyers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

Most recently, combined electrically heatable and "light-off" converters have been provided in which electrically heatable flat thin metal strips are alternated with non-electrically heatable corrugated thin metal strips and spirally wound in a jacket tube to provide what is called an integral structure, that is, where the electrically heatable portion is tied to the "light-off" portion by interleafing the corrugated thin metal sheets with the flat, electrically heatable thin metal sheets, and intertwining the assembly, as by spirally winding, into a suitable housing or jacket tube. Such structures are disclosed in the aforesaid Ser. No. 08/013,516 and 08/066,887.

A common problem with prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at a high temperature (between 800 and 950 degrees C.; 1472 to 1742 degrees F., respectively) with exhaust gas from a running internal combustion engine simultaneously passing through the device. If the catalytic device telescopes or displays separation or folding over of the leading or upstream edges of the foil leaves up to a predetermined time, e.g., 5 to 200 hours, the device is said to fail the test. Five hours is equivalent to 1.8 million cycles at 100 Hertz.

The Hot Cycling Test is one with exhaust gas flowing at 800 to 950 degrees C.; 1472 to 1742 degrees F.) and cycled to 120 to 150 degrees C. once every 15 to 20 minutes, for 300 hours. Telescoping or separation of the leading edges of the thin metal foil strips is considered a failure.

The Hot Shake Test and the Hot Cycling Test are hereinafter called "Hot Tests" and have proved very difficult to survive. Other durability tests are known for EHC's including an electrical cycling test. The EHC is heated to 500–700 degrees C. at rated power and then fan cooled, cycling every 1–3 minutes. This is done for 50,000 cycles. There should be no changes in electrical resistance.

The structures of the present invention will survive these Hot Tests.

In the following description, reference will be made to "ferritic" stainless steel. A suitable ferritic stainless steel for use particularly in the engine exhaust applications hereof is described in U.S. Pat. No. 4,414,023 dated 8 Nov. 1983 to Aggen. A specific ferritic stainless steel alloy useful herein contains 20% chromium, 5% aluminum, and from 0.002% to 0.05% of at least one rate earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV." Another metal alloy especially useful herein is identified as Haynes 214 alloy which is commercially available. This alloy and other nickeliferous alloys are described in U.S. Pat. No. 4,671,931 date 9 Jun. 1987 to Herchenroeder et al. A specific example contains 75% nickel, 16% chromium; 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steels and the Haynes alloys 214 and 230 are examples of high temperature resistive, oxidation resistant (or corrosion resistant) metal alloys that are suitable for use in making thin metal strips for use in the converter bodies hereof, and particularly for making heater strips for the EHC (electrically heatable converter) portions and "light-off" portions hereof. Suitable metals must be able to withstand "high" temperatures of 900 degrees C. to 1200 degrees C. (1652 degrees F. to 2012 degrees F.) over prolonged periods.

Other high temperature resistive, oxidation resistant metals are known and may be used herein. For most applications, and particularly automotive applications, these alloys are used a "thin" metal strips, that is, having a thickness of from about 0.001" to about 0.005", and preferably from 0.0015" to about 0.003".

BRIEF STATEMENT OF THE INVENTION

Briefly stated, the present invention is an improvement in a converter having an electrically heatable portion and a non-electrically heated portion. The electrically heatable portion has at least one thin metal heater strip connected in an electrical circuit and is electrically heatable through terminal connections to voltage source. The non-electrically heated portion has at least one corrugated thin metal strip alternating with flat thin metal strips which are not electrically heatable and which corrugated thin metal strip is intertwined with said heater strip and carried in a housing. Normally, the corrugated strips are secured to the housing and thus at ground potential. The improvement is, in lieu of a ground connection, an electrical connection from the heater strip circuit at a point intermediate the terminal connections to said voltage source, to the ungrounded corrugated thin metal strip, whereby the electrical potential of the corrugated thin metal strip is held to a potential between the potentials at the terminal connections. The thin metal strips are desirably coated as will be specifically pointed out below.

For example, if a coated thin metal heater strip is assumed as connected to a 50 volt DC voltage source, one end can be viewed as having a potential of zero, while the opposite end of the strip is at +50 volts. A contiguous coated corrugated thin metal strip not being connected in any electrical circuit and not being grounded by attachment to the housing, (i.e., insulated from said housing as for example, disclosed in commonly owned copending application Ser. No. 08/164, 038 filed 9 Dec. 1993), would see a potential difference adjacent the opposite end of the heater strip of 50 volts. This potential difference is normally sufficient to arc through the coating and ultimately damage the converter body. However, if, as set forth in this invention, an electrical connection is provided at an intermediate point in the circuit, for example, the midpoint of the heater strip to any point on the corrugated strip, imposing a potential of 25 volts on the corrugated strip, then the potential difference at the opposite end is only 25 volts (50–25) which potential difference is insufficient to break through the coating.

The invention also contemplates a method of reducing the potential difference between a point along a heater strip connected in an electrical circuit for purposes of heating said heater strip, and a contiguous coated corrugated thin metal strip which is not grounded through the housing which comprises "anchoring" the heater strip to the corrugated strip by connecting one to the other with an electrical conductor.

BRIEF DESCRIPTION OF THE DRAWINGS

The invention may be better understood by having reference to the annexed drawings wherein:

FIG. 3 shows in diagrammatic and schematic form a single circuit design for an anchored circuit.

FIG. 4 shows in diagrammatic and schematic form a two-circuit design for an anchored circuit.

FIG. 5 is an electrical schematic for an anchored core design.

DETAILED DESCRIPTION OF THE INVENTION

Figure 1:
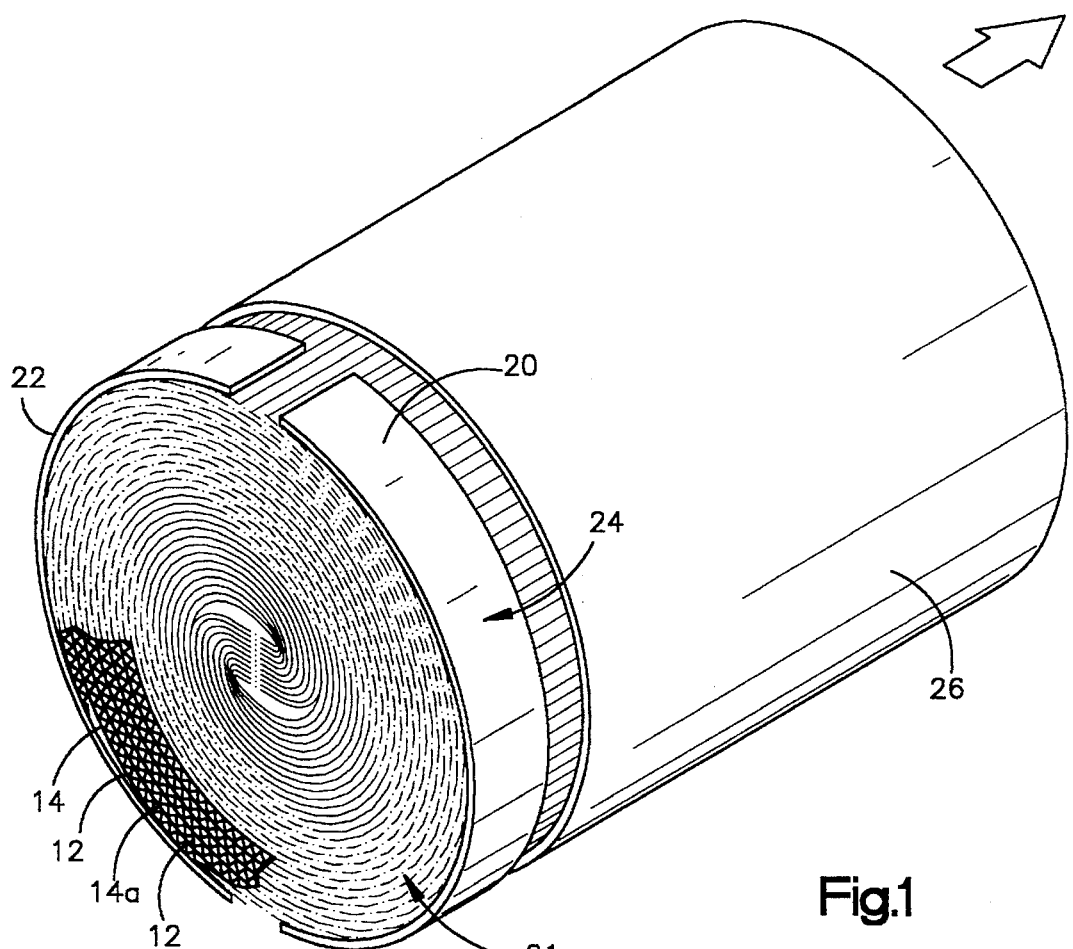
FIG. 1 is an isometric perspective view of core body of the integral type having flat electrically heated thin metal strips forming an electrically heatable portion intertwined with corrugated thin metal strips which are not electrically heated and extend into a "light-off" portion, and showing a segmented retaining shell for the EHC portion and a fully tubular shell or housing in the "light-off" portion.

Referring now to FIG. 1, there is here shown a perspective view of a converter body in accordance with this invention and showing the dual nature of the electrically heatable devices hereof. The front portion 24 is defined by an S-wound core generally indicated at 21 retained in a pair of arcuate members 22 and 20. The arcuate members 22 and 20 are electrically isolated, one of which is adapted to be attached to one pole of a voltage source, not shown, e.g., a 12 volt storage battery, and the other of which is adapted to be attached to the other pole of said storage battery. In the front portion 24 are shown the upstream ends of the electrically heatable flat thin metal strips 14a, the upstream ends of the flat thin metal strips 14 which are not electrically heated, and the upstream ends of the corrugated thin metal strips 12. In regard only to the flat strips, alternate flat strips 14 extend the entire axial length of the converter body of FIG. 1, whereas the heatable flat thin metal strips 14a in alternating relation with the flat thin metal strips 14 extend only a relatively short axial distance, e.g., 0.25" to 2" into the converter body. The remaining portions 14b of the flat strips 14a–14b extend the remaining axial distance of the converter body of FIG. 1, and in combination with the corrugated thin metal strips 12 define the "light-off" portion of the converter. The flat thin metal strips 14a are spaced from and out of electrical contact with the remaining portions 14b, the axial spacing distance being from about 0.05" to about 0.25", e.g., 0.075". It will be seen, therefore, that the EHC portion and the "light-off" portion of the converter bodies hereof are indeed integral because, for example, the several corrugated thin metal strips 12 may extend the entire axial length of the converter body, while the heater bands 14a in the EHC portion extend only a relatively short axial distance into the converter body and are then separated from the balance of the flat strip 14b. The core body contained in an inner housing 24, 26 shown in FIG. 1 is adapted to be contained in an outer housing, not shown, but clearly shown and described in the aforesaid U.S. Ser. No. 08/066,887 incorporated herein by reference.

Figure 2:
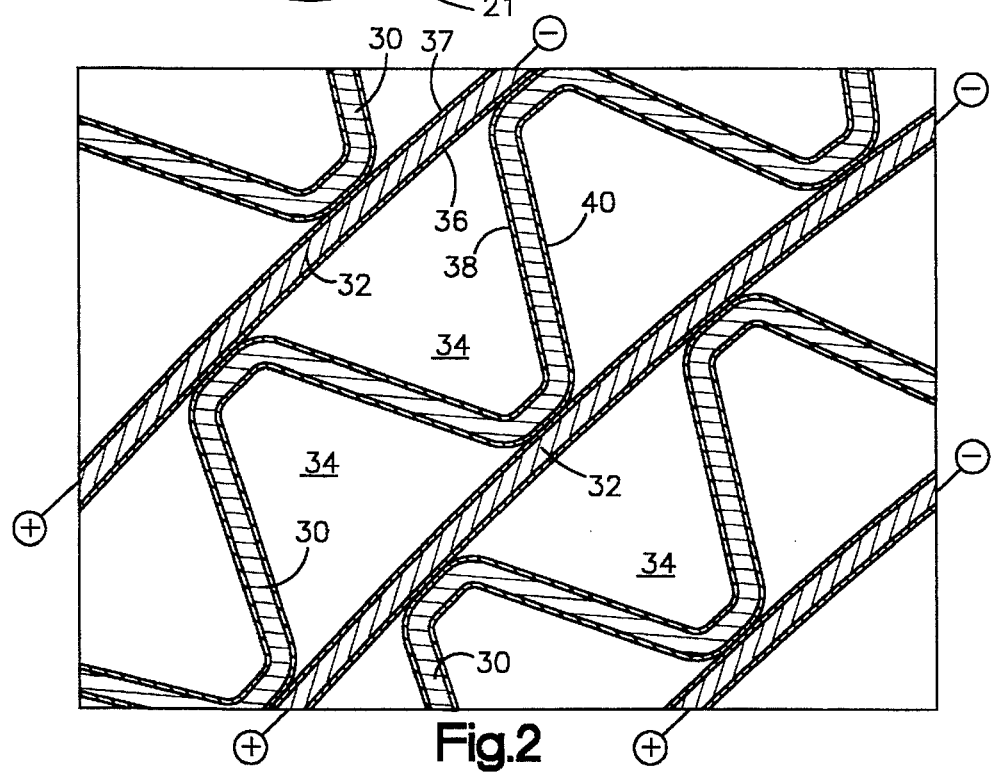
FIG. 2 is a fragmentary end view on an enlarged scale of an integral type EHC and "light-off" converter such as shown in FIG. 1, showing the cells formed by the alternating flat and corrugated thin metal strips in contiguous relation.

FIG. 2 shows a fragment of an end view on an enlarged scale of the electrically heatable core body hereof showing the alternating relationship of the flat and corrugated thin metal strips. Corrugated thin metal strips 30 are shown in alternating relation with flat thin metal strips 32, and together they define cells 34 through which exhaust gas flows. The corrugated thin metal strips do not carry current. In the anchored circuit hereof, the electrical potential of any point on the corrugated thin metal strips or leaves will be intermediate, e.g., the midpoint, the two terminal potentials. The flat heater strips 32 carry current. The electrical potential at a given point on the strips 32 may be the potential on the potential gradient between the two terminal potentials. The potential gradient may extend, for example, from 0 volts at one terminal to 50 volts at the other terminal. The anchor connection may be, for example, at the midpoint, e.g., 25 volts. As indicated above, the thin metal foil strips 30 and 32 are coated with a coating. Thus on flat strip 32, the coating 36 is on one side and the coating 37 is on the opposite side. With the corrugated thin metal strips 30, there is provided a coating 38 on one side and a coating 40 on the other side. In the preferred case, the coatings 36, 37, 38 and 40 are put on the strips prior to assembly. See U.S. Pat. No. 4,711.009 supra to Cornelison et al. These coatings are very thin, e.g., 0.00005" to 0.002" thick. The coatings 36, 37, 38, and 40 are conveniently a refractory metal oxide, e.g., alumina, alumina/ceria, titania, titania/alumina, titania/ceria, silica, zirconia, zirconia/alumina, etc. While these coating may be used on both the corrugated and flat thin metal strips, the electrically heatable flat thin metal strips are desirably coated with a "dielectric" coating, or a chrome oxide coating such as Bureau of Standards Coating A-418.

A typical procedure for applying a "dielectric" coating involves first coating the thin metal strip, whether flat or corrugated, and preferably formed of an aluminum-containing high temperature resistive, oxidation resistant alloy, with a single coat of gamma-alumina in an aqueous slurry at a loading of about 5 mg per square inch of surface. This step is followed by drying and then calcining at 800 to 1200 degrees C. (1472 to 2192 degrees F.) for at least about 10 seconds, to form a tightly bonded insulative coating, and then coating again with from 1 to 6 or more coatings of gamma-alumina/ceria mixture to a loading of about 30 to 40 mgs. per square inch, drying after each coat, and then calcining at about 500 degrees C. (930 degrees F.). The usual coating with a refractory metal oxide produced at a lower temperature of 500 to 1200 degrees F. also has insulating properties, but not to the same extent as the "dielectric" coating. The "dielectric" coating is believed to be a spinel and thus chemically different from the normal refractory metal oxide calcined at a lower temperature. Both types of coatings may be used in a given embodiment of converter bodies of the present invention. The "dielectric" coated core elements are usually only the heater strips 30 and 32 in FIG. 2, or 14a in FIG. 1. The "dielectric" coated strips have a higher dielectric strength than the usual refractory metal oxide coated strips.

Another useful insulative high temperature resistive coating is composed of a silica glass frit 46%, chrome oxide 19.6%, Black Label Clay 5% and deionized water 31.4% applied as a slurry and calcined at approx. 950 degrees C. for less than 5 minutes. This composition has a Bureau of Standards number A-418 Coating. It may be applied by dip coating, or by spray application.

FIG. 3 shows a structure for the electrically heatable portion in which the corrugated strips 50 are connected at their midpoints by a weldment 54, e.g., a spot weld, to the flat thin metal strips 52. Ends 56 of the flat thin metal strips 52 are attached to a terminal strip 58 which is in turn attached to the positive pole of a voltage source, not shown. The other ends 60 of the flat thin metal strips 52 are attached to a terminal strip 62 which is in turn attached to the negative pole of the voltage source, not shown. The schematic of FIG. 3 is a single circuit design.

FIG. 4 shows a two-circuit design for the electrically heatable portion of the converters hereof. Here flat strips 70 and 72 are connected at ends 75 and 77 to a terminal strip 74, which terminal strip is connected in turn to the positive pole of a voltage source, not shown. The opposite ends 78 and 80 are welded or brazed to an inner metallic housing represented by the connector strip 76 which is desirably insulated from any ground potential. Flat strips 82 and 84 are connected at the ends 81 and 83 to the connector strip 76 and back to a terminal strip 86 to which strips 82 and 84 are connected at their ends 87 and 89. Terminal strip 86 is connected to the negative pole of a voltage source, not shown. The corrugated strips are connected to the connector strip 76 at their proximal ends 92, which, so far as FIG. 4 is concerned, is the midpoint of the circuit. The distal ends 94 of the corrugated thin metal strips are not attached to any part of the electrical circuit and current cannot flow through the corrugated thin metal strips 90.

FIG. 5 is a schematic diagram of an electrical circuit in accordance herewith. Here are shown a flat electrically heatable heater strip 100 and a non-electrically heated corrugated strip schematically contained in the box marked 115. The heater strip 100, which may be corrugated, if desired, is connected at one end to a terminal 104, and at the other end to a terminal 106. The potential at terminal 104 is indicated as zero volts and the potential at terminal 106 is indicated as 50 volts. The resistance of the heater strip 100 is indicated by the series connected resistances 108, 110, 112, and 114. The corrugated foil in the box 115 is connected or anchored to the midpoint 116 of the heater strip 100 by an anchor connection 118. Thus, the leaf-to-leaf potential difference at the end 120 is a maximum of 25 volts, and not 50 volts which it would be but for the anchor connection 118. Also at the end 122, the potential is −25 volts with the anchor connection in place. The 50 volt potential difference would be sufficient to arc through the insulative coatings on the respective strips 100 and 102 and ultimately damage the core of the converter. The potential difference of 25 volts with the anchor 118 in place is insufficient to break through the insulative coatings on the respective strips 100 and 102. The anchor 118 does not need to be placed at the midpoint of the respective strips 100 and 102 as shown in FIG. 5, but may be located at any point intermediate the ends 104 and 106 and connect with an opposite point on the corrugated thin metal strip, e.g., any point intermediate the ends 120 and 122. To attain the highest possible resistance to arcing, the anchor 118 should be placed at the midpoint of the respective strips 100 and 102.

Reference may be had to co-pending commonly owned U.S. patent application Ser. No. 07/926,045 filed 5 Aug. 1992 by Whittenberger for a suitable switching circuit for delivering higher power to the electrically heatable portion of the converter and using MOSFETs (metal oxide semiconductor field effect transistors).

What is claimed is:

1. A method for reducing the potential difference between a point along a thin metal heater strip in a housing and connected in an electrical circuit for purposes of heating said heater strip, and a contiguous coated corrugated thin metal strip which is insulated from said housing which comprises the step of anchoring the thin metal heater strip to said corrugated thin metal strip by connecting one strip to the other with an electrical conductor.

* * * * *